Nov. 10, 1925.  
T. DOLAN  
1,560,673
ELECTRIC HEATER FOR AUTOMOBILE RADIATORS
Filed June 15, 1925
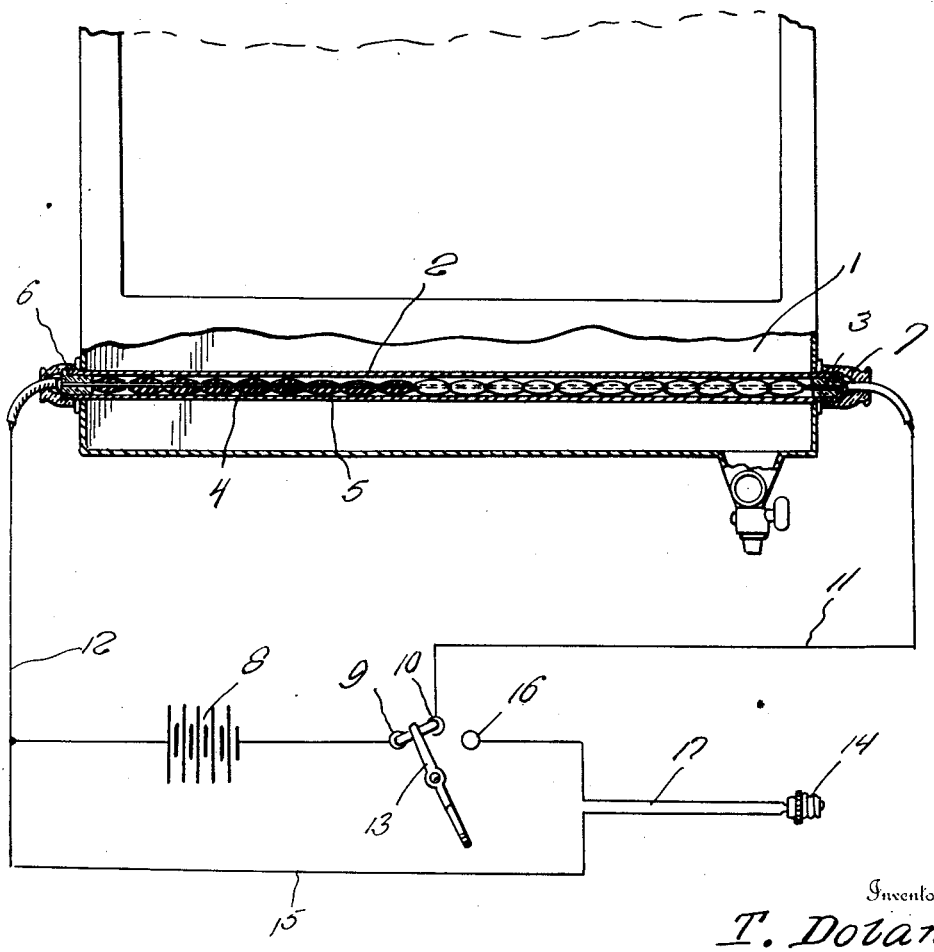
Inventor  
T. Dolan,
By  
Clarence A. O'Brien  
Attorney Patented Nov. 10, 1925.

UNITED STATES PATENT OFFICE.

TIMOTHY DOLAN, OF MANCHESTER, NEW HAMPSHIRE.

ELECTRIC HEATER FOR AUTOMOBILE RADIATORS.

Application filed June 15, 1925. Serial No. 37,286.

*To all whom it may concern:*

Be it known that I, TIMOTHY DOLAN, a citizen of the United States, residing at Manchester, in the county of Hillsborough and State of New Hampshire, have invented certain new and useful Improvements in an Electric Heater for Automobile Radiators, of which the following is a specification.

This invention relates to improvements in electric heaters for automobile radiators and has for its principal object to provide a simple and efficient device which may be readily and easily installed in the lower chamber of an automobile radiator whereby the radiator will be prevented from freezing during cold weather.

One of the important objects of the present invention is to provide an automobile radiator water heater which includes a means whereby the heating unit may be energized and supplied with the current from the battery of the automobile for use particularly when the automobile is in operation, the heater being further provided with means whereby the ordinary house current may be employed for energizing the heating unit when the automobile is in a garage, thus obviating the necessity of having to heat the garage during cold weather.

A further object of the invention is to provide an electric heater for automobile radiators which is of such construction as to permit the same to be readily and easily installed, the same being further of such size as not to interfere with the flow of water through the radiator.

A further object is to provide an electric heater for automobile radiators of the above mentioned character which is simple in construction, inexpensive and furthermore adapted to the purposes for which the same is designated.

Other objects and advantages of this invention will become apparent during the course of the following description.

In the accompanying drawing forming part of this specification, and in which like numerals are employed to designate like parts throughout the same:

The figure represents a fragmentary front elevation of an automobile radiator, with the lower portion thereof broken away illustrating the manner in which my improved electric heater is associated therewith, the wiring for the heater being also illustrated.

In the drawing wherein for the purpose of illustration is shown the preferred embodiment of my invention, the numeral 1 designates the bottom header of an automobile radiator of the conventional construction. The electric heater comprises an elongated tube 2 which is formed of any suitable material, the same extending longitudinally within the bottom header 1 and having its ends extending through suitable openings provided therefor in the respective sides of the radiator.

The ends of the tube 2 are externally threaded preferably at 3. The heating unit comprises an elongated wire 4 which extends centrally through the tube 2 and is spaced from contact with the inner wall of the tube through the medium of the glass beads 5, the latter being strung on the wire 4 in any suitable manner. The ends of the wire 4 comprises the heating unit and also extends through the glass or other insulated bushing 6 which are fitted in the respective ends of the tube 2. An insulated protector sleeve 7 is threaded over each of the ends of the tube 2 and incloses the respective ends of the wire 4 as is clearly illustrated in the drawing.

The electric battery which is carried by the automobile is indicated at 8. Arranged in the circuit with the battery 8 are the spaced contacts 9 and 10 respectively, the contact 10 being connected to one end of the heating unit or wire 4 through the medium of the wire 11. The other end of the wire 4 is connected to the electric storage battery 8 through the wiring 12. A pivoted switch 13 is preferably arranged on the dash board, and the same bridges the contacts 9 and 10, the circuit will be closed to the battery and thus energizing the heating wire 4 so that the radiator will be heated when the automobile is in operation or is standing on the street.

For the purpose of energizing the heating unit of the heater when the automobile is in the garage so as to obviate the necessity of having to heat the garage, there is provided an electric plug 14 of any conventional construction, the same being connected to the wire 12 through the medium of the wire 15, the plug 14 being further connected to the contact 16 through the wire 17. When the plug 14 is in an electric socket provided therefor, it is located in the garage, and the switch 13 is actuated so as to break the circuit between the contacts 9 and 10 and bridge the contacts 10 and 16 so that the current will flow through the wires 11 and 17, and 12 and 15 respectively to the wire 4, it being understood of course that the electric plug 14 is connected with the house current.

It will thus be seen from the description, that an electric heater for automobile radiators has been provided which may be readily and easily installed and the heating units may be either energized by the storage battery on the automobile when the automobile is in operation, or by the house current supplied to the garage when the automobile is in the same. Furthermore, an electric heater of the above mentioned character will at all times be positive and efficient in carrying out the purposes for which it is designated.

While I have shown the preferred embodiment of my invention, it is to be understood that various changes in the size, shape and arrangement of parts may be resorted to without departing from the spirit or sacrificing the appended claim.

What I claim as new is:

In combination with an automobile radiator, of an electric heater therefor comprising a tube extending longitudinally in the bottom header of the radiator, the ends of said tube extending through the respective sides of the radiator, and being threaded, bushings of insulated material fitted in the respective ends of the tube, a heating wire extending longitudinally through the tube and through the bushings, beads of insulated material strung on said wire for spacing the same from the inner wall of the tube, insulated closures for the respective ends of the tube, said closures being threaded on the threaded end of the tube, and means for energizing the heating wire.

In testimony whereof I affix my signature.

TIMOTHY DOLAN.